United States Patent
Lee et al.

(10) Patent No.: US 12,368,473 B2
(45) Date of Patent: Jul. 22, 2025

(54) METHOD AND APPARATUS FOR CODEBOOK DESIGN IN COMMUNICATION SYSTEM

(71) Applicant: ELECTRONICS AND TELECOMMUNICATIONS RESEARCH INSTITUTE, Daejeon (KR)

(72) Inventors: An Seok Lee, Daejeon (KR); Heesoo Lee, Daejeon (KR); Seung Jae Bahng, Daejeon (KR); Jung Sook Bae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 35 days.

(21) Appl. No.: 18/390,592

(22) Filed: Dec. 20, 2023

(65) Prior Publication Data

US 2024/0243781 A1 Jul. 18, 2024

(30) Foreign Application Priority Data

Dec. 20, 2022 (KR) .......................... 10-2022-0179863

(51) Int. Cl.
*H04B 7/04* (2017.01)
*H04B 7/01* (2006.01)

(52) U.S. Cl.
CPC .......... *H04B 7/04026* (2023.05); *H04B 7/01* (2013.01)

(58) Field of Classification Search
CPC .... H04B 7/04026; H04B 7/01; H04B 7/0408; H04B 7/0456; H04B 7/0617; H04B 7/145
See application file for complete search history.

(56) References Cited

U.S. PATENT DOCUMENTS

| | | | |
|---|---|---|---|
| 11,632,163 B1 | 4/2023 | Chisu et al. | |
| 2021/0067237 A1 | 3/2021 | Sampath et al. | |
| 2022/0247480 A1* | 8/2022 | Papadopoulos | G01S 5/0273 |
| 2023/0047993 A1 | 2/2023 | Jian et al. | |
| 2023/0075115 A1* | 3/2023 | Wu | H04W 72/40 |
| 2023/0097583 A1 | 3/2023 | Lee et al. | |
| 2023/0145844 A1 | 5/2023 | Kwon et al. | |
| 2023/0188170 A1 | 6/2023 | Dutta et al. | |

FOREIGN PATENT DOCUMENTS

| | | |
|---|---|---|
| WO | 2021236510 A1 | 11/2021 |
| WO | 2022049112 A1 | 3/2022 |
| WO | 2023027556 A1 | 3/2023 |
| WO | 2023063721 A1 | 4/2023 |

\* cited by examiner

*Primary Examiner* — Sung S Ahn
(74) *Attorney, Agent, or Firm* — Rabin & Berdo, P.C.

(57) ABSTRACT

Disclosed are a method and an apparatus for codebook design in a communication system. A method of a base station may comprise: transmitting a pilot signal to a terminal by using a reconfigurable intelligent surface (RIS); receiving, from the terminal, channel information measured based on the pilot signal; estimating characteristics of elements of the RIS based on the channel information; generating a codebook based on the estimated characteristics of the elements; and transmitting the codebook to a controller of the RIS.

13 Claims, 12 Drawing Sheets

METHOD AND APPARATUS FOR CODEBOOK DESIGN IN COMMUNICATION SYSTEM

CROSS-REFERENCE TO RELATED APPLICATIONS

This application claims priority to Korean Patent Application No. 10-2022-0179863, filed on Dec. 20, 2022, with the Korean Intellectual Property Office (KIPO), the entire contents of which are hereby incorporated by reference.

BACKGROUND

1. Technical Field

The present disclosure relates to codebook design in a communication system, and more particularly, to codebook design in a communication system using a reconfigurable intelligent surface (RIS).

2. Related Art

A communication system can utilize various methods to maximize channel capacity in a given channel environment. These methods include encoding and decoding on the channel between a transmitting end (e.g., base station) and a receiving end (e.g., terminal). Additionally, the communication system may employ optimization of modulation and demodulation schemes for signals. Certain areas may experience shadowing depending on the channel conditions of the communication system, leading to potential reduction in signal transmission rates. In such cases, problems arising due to channel conditions may pose challenges in resolution.

Therefore, a reconfigurable intelligent surface (RIS) is being discussed as a solution to the aforementioned problems. The RIS has the ability to reflect input signals in a desired direction. It comprises multiple elements, and can adjust the phases of the signals based on these elements to achieve the desired signal reflection.

The RIS may incorporate passive elements, enabling it to be made smaller and lighter. Furthermore, due to its low power consumption, the RIS can be installed on the exterior walls of buildings and surfaces of moving objects.

To steer signals effectively, the RIS's controller adjusts the impedances of its elements, thereby altering the phases of the signals. Beamforming is achieved by the RIS using phase information transmitted from a base station. However, if the base station and the RIS are connected by wires, this may impose restrictions on the installation and use of the RIS. Therefore, it is preferable for the RIS to be controlled wirelessly by the base station. In other words, the base station controls the RIS's controller via a wireless control link. The base station may quantize the 360 degrees of phase to control the RIS. However, due to limited radio resources, it may be challenging for the base station to quantize all 360 degrees of phase. Therefore, the base station can utilize a codebook scheme, employing only a subset of representative phase values within the 360-degree range.

SUMMARY

The present disclosure for achieving the above-described objective is directed to providing a method and an apparatus for codebook design in a communication system.

A method of a base station, according to exemplary embodiments of the present disclosure for achieving the above-described objective, may comprise: transmitting a pilot signal to a terminal by using a reconfigurable intelligent surface (RIS); receiving, from the terminal, channel information measured based on the pilot signal; estimating characteristics of elements of the RIS based on the channel information; generating a codebook based on the estimated characteristics of the elements; and transmitting the codebook to a controller of the RIS.

The method may further comprise: transmitting the pilot signal to the terminal using the RIS changed by the codebook; receiving, from the terminal, channel information re-measured based on the pilot signal; re-estimating the characteristics of the elements of the RIS based on the re-measured channel information; adjusting the codebook based on the re-estimated characteristics of the elements; and transmitting the adjusted codebook including changed values to the controller of the RIS.

The characteristics of the elements may include at least one of reflection coefficient, minimum reflection coefficient, phase difference, or phase change rate.

The generating of the codebook based on the estimated characteristics of the elements may include: generating the codebook by quantizing a value of a reflection coefficient and a phase of a signal.

The generating of the codebook based on the estimated characteristics of the elements may include: generating the codebook reflecting change characteristics of reflection coefficients of the elements based on at least one of minimum reflection coefficient, phase difference, or phase change rate.

A method of a terminal, according to exemplary embodiments of the present disclosure for achieving the above-described objective, may comprise: receiving a pilot signal from a base station through a reconfigurable intelligent surface (RIS); generating channel information based on the pilot signal; transmitting the channel information to the base station; and performing communication with the base station through the RIS based on a codebook generated based on the channel information, wherein characteristics of elements of the RIS are estimated based on the channel information, and the codebook is generated considering the characteristics of the elements.

The method may further comprise: receiving a pilot signal from the base station through the RIS changed by the codebook; re-generating channel information based on the pilot signal; transmitting the re-generated channel information to the base station; and performing communication with the base station through the RIS adjusted based on a codebook adjusted considering the re-generated channel information, wherein adjusted characteristics of the elements of the adjusted RIS are estimated based the re-generated channel information, and the adjusted codebook is generated based on the adjusted characteristic of the elements.

The characteristics of the elements may include at least one of reflection coefficient, minimum reflection coefficient, phase difference, or phase change rate.

A base station, according to exemplary embodiments of the present disclosure for achieving the above-described objective, may comprise: at least one processor, and the at least one processor may cause the base station to perform: transmitting a pilot signal to a terminal by using a reconfigurable intelligent surface (RIS); receiving, from the terminal, channel information measured based on the pilot signal; estimating characteristics of elements of the RIS based on the channel information; generating a codebook based on the estimated characteristics of the elements; and transmitting the codebook to a controller of the RIS.

The at least one processor may further cause the base station to perform: transmitting the pilot signal to the terminal using the RIS changed by the codebook; receiving, from the terminal, channel information re-measured based on the pilot signal; re-estimating the characteristics of the elements of the RIS based on the re-measured channel information; adjusting the codebook based on the re-estimated characteristics of the elements; and transmitting the adjusted codebook including changed values to the controller of the RIS.

The characteristics of the elements may include at least one of reflection coefficient, minimum reflection coefficient, phase difference, or phase change rate.

In the generating of the codebook based on the estimated characteristics of the elements, the at least one processor may further cause the base station to perform: generating the codebook by quantizing a value of a reflection coefficient and a phase of a signal.

In the generating of the codebook based on the estimated characteristics of the elements, the at least one processor may further cause the base station to perform: generating the codebook reflecting change characteristics of reflection coefficients of the elements based on at least one of minimum reflection coefficient, phase difference, or phase change rate.

The present disclosure proposes an initial beam search procedure and a codebook design method for beamforming in a network including an RIS, and the present disclosure considers characteristics of elements of the RIS. Furthermore, the present disclosure proposes a codebook design method by considering a model representing a magnitude of reflection coefficient according to a phase of the element. Through the proposed methods, the performance of the network including the RIS can be improved.

DETAILED DESCRIPTION OF THE EMBODIMENTS

Figure 1:
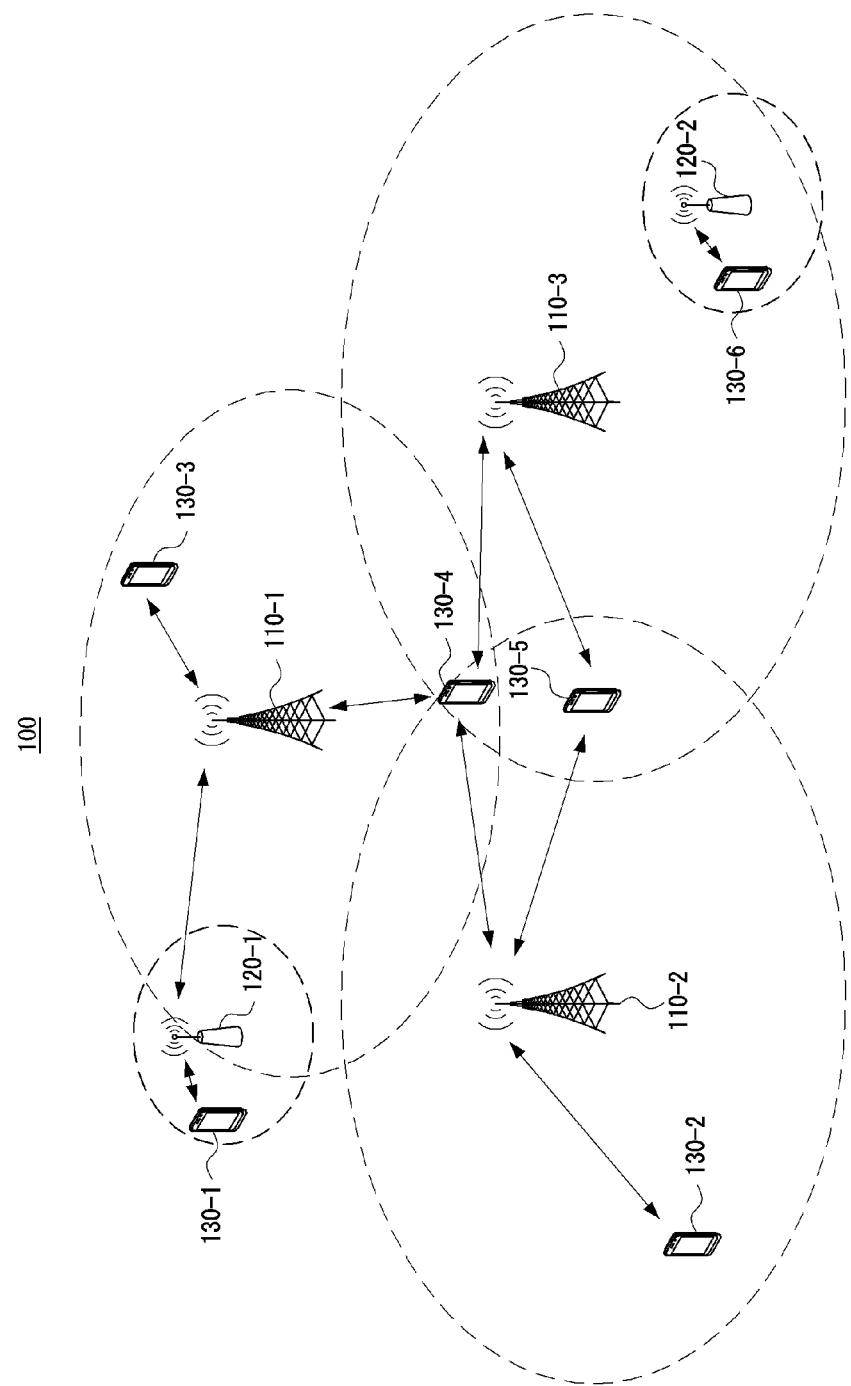
FIG. 1 is a conceptual diagram illustrating a first exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

A communication system or a memory system to which exemplary embodiments according to the present disclosure are applied will be described. The communication system or memory system to which the exemplary embodiments according to the present disclosure are applied is not limited to the content described below, and the exemplary embodiments according to the present disclosure may be applied to various communication systems. Here, a communication system may be used in the same sense as a communication network.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. In addition, the communication system 100 may further include a core network (e.g. serving-gateway (S-GW), packet data network (PDN)-gateway (P-GW), and mobility management entity (MME)). When the communication system 100 is the 5G communication system (e.g. NR system), the core network may include an access and mobility management function (AMF), a user plane function (UPF), a session management function (SMF), and the like.

The plurality of communication nodes 110 to 130 may support the communication protocols (e.g. LTE communication protocol, LTE-A communication protocol, NR communication protocol, etc.) defined by technical specifications of 3rd generation partnership project (3GPP). The plurality of communication nodes 110 to 130 may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like. Each of the plurality of communication nodes may mean an apparatus or a device. Exemplary embodiments may be performed by an apparatus or device. A structure of the apparatus (e.g. device) may be as follows.

Figure 2:
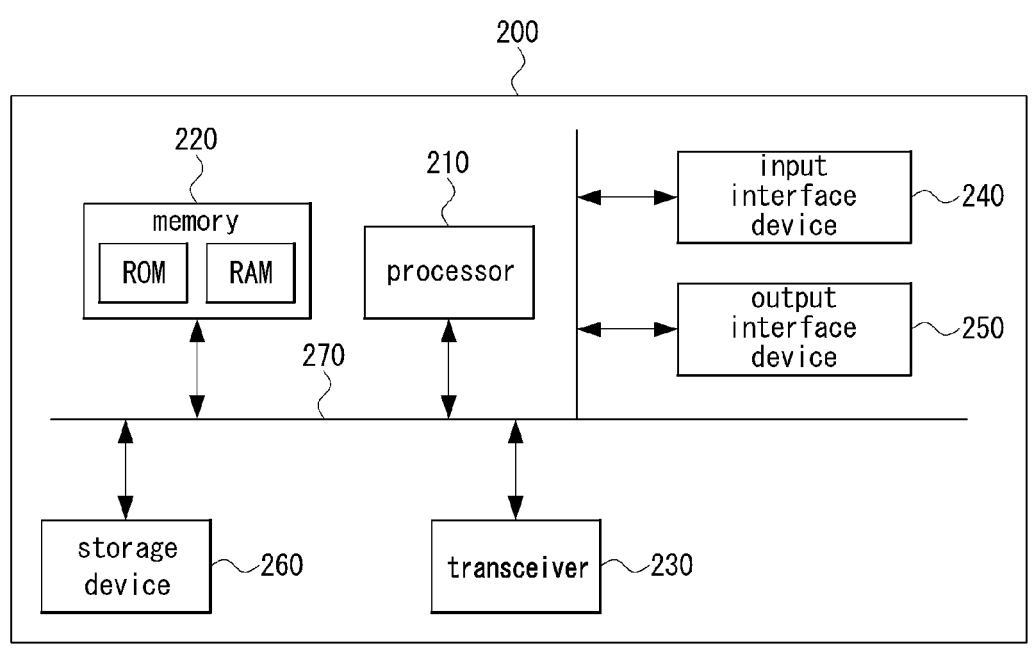
FIG. 2 is a block diagram illustrating an exemplary embodiment of an apparatus.

FIG. 2 is a block diagram illustrating an exemplary embodiment of an apparatus.

Referring to FIG. 2, an apparatus 200 may comprise at least one processor 210, a memory 220, and a transceiver 230 connected to the network for performing communications. Also, the apparatus 200 may further comprise an input interface device 240, an output interface device 250, a storage device 260, and the like. The respective components included in the apparatus 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), gNB, advanced base station (ABS), a high reliability-base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability-relay station (HR-RS), a home NodeB (HNB), a home eNodeB (HeNB), a roadside unit (RSU), a radio remote head (RRH), a transmission point (TP), a transmission and reception point (TRP), or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g. a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, device-to-device (D2D) communication (or, proximity services (ProSe)), Internet of Things (IoT) communications, dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e. the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the COMP transmission manner, and the fourth terminal 130-4 may receive the signal from the first base station 110-1, the second base station 110-2, and the third base station 110-3 in the COMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, signal transmission and reception methods in a communication system will be described. Even when a method (e.g. transmission or reception of a data packet) performed at a first communication node among communication nodes is described, the corresponding second communication node may perform a method (e.g. reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

Meanwhile, in order to process rapidly increasing wireless data, the 5G (or NR) communication or subsequent wireless communication technologies can support communication in relatively high frequency bands. For example, radio frequency bands used for wireless communication in the 5G (or NR) communication specifications may be broadly classified into frequency range 1 (FR1) bands and frequency range 2 (FR2) bands. Here, the FR1 bands may refer to relatively low frequency bands as compared to the FR2 bands, which are of about 7 GHz or below. The FR2 bands may refer to relatively high frequency bands as compared to the FR1 bands, which are of about 7 GHz or above. The FR2 bands may be 28-29 GHz bands, which include unlicensed bands, millimeter wave bands, and terahertz wave bands.

In addition, in the 5G (or NR) communication system, a carrier bandwidth is defined as up to 100 MHz in FR1 and up to 400 MHz in FR2. Since the 5G (or NR) communication system requires a further increase in carrier bandwidth compared to the maximum bandwidth 20 MHz supported by the LTE system, there is a possibility that it may not be able to support the entire carrier bandwidth of up to 400 MHz depending on a power and computing capability of a terminal. Accordingly, in the 5G (or NR) specifications, some continuous resource blocks within the carrier bandwidth are defined and used as a bandwidth part (BWP). A BWP may be defined to have a different center frequency, bandwidth, and numerology for each terminal, and one terminal can activate only one BWP within a single carrier bandwidth.

The BWP may be freely defined within the carrier bandwidth, and furthermore, the activated BWP may be switched and used as a service required by the terminal changes. Switching and using a BWP as described above may be referred to as 'BWP adaptation'. The current 5G technical specifications describe a method of increasing scheduling flexibility by moving a center frequency, a method of increasing a bandwidth to transmit a larger amount of data, or a method of changing a numerology to select a subcarrier spacing suitable for the current service through BWP adaptation.

Describing the contents defined in the current 5G (or NR) technical specifications, one frame used when communicating within a BWP may consist of two half-frames of 5 ms each, and each half frame may consist of subframes of 1 ms each. Accordingly, there are a total of 10 subframes within one frame. Additionally, one subframe may be composed of one or multiple slots according to a subcarrier spacing (SCS). For example, one subframe may consist of one slot when an SCS of 15 KHz is used, one subframe may consist of two slots when an SCS of 30 KHz is used, and one subframe may consist of four slots when an SCS of 60 KHz is used. In this case, each slot may be composed of 14 symbols when a normal cyclic prefix (CP) is used.

As described above, the 5G (or NR) communication system uses various types of SCS, and may have different SCSs within the same bandwidth depending on the type of BWP. Since the SCS varies depending on the type of BWP, a type of reference coordinate that specifies the location of each resource block is required, which is called 'point A'. That is, the point A may be used to designate a specific reference resource block within the corresponding BWP.

Hereinafter, issues related to a codebook in 5G (or NR) will be described briefly. The 5G standard defines a phase-tracking reference signal (PT-RS or PTRS) due to the use of high-frequency bands. The PTRS is used in receivers and transmitters to track phases of local oscillators. This suppresses phase noises and common phase errors, which are particularly important at high carrier frequencies such as millimeter waves. Due to the nature of phase noises, the PTRS may have low density in the frequency domain but high density in the time domain. The PTRS can exist in both downlink (related to PDSCH) and uplink (related to PUSCH). In case that the PTRS is transmitted, the PTRS is always associated with one DMRS port and is limited by a reserved bandwidth and duration of a PDSCH/PUSCH. The time and frequency densities of PTRS may be adjusted according to a signal to noise ratio (SNR) and a scheduling bandwidth.

Meanwhile, the 5G (or NR) defines a precoding matrix indicator (PMI). The PMI may be configured in the UE by higher layer parameters, or may be provided to the UE based on signaling information such as DCI. The UE can measure and report information on PMI(s) to a base station (e.g. gNB). However, the base station may or may not use the PMI(s) reported by the UE. From the base station's perspective, the UE may be instructed to use a specific PMI. In this case, the UE should use a specific precoding matrix specified by the base station.

In addition, a codebook may be understood as a set of precoding matrices. In other words, a codebook may be regarded as a type of matrix with elements representing complex numbers that convert data bits of a PDSCH into another data set mapped to respective antenna ports. The codebook may be classified into a codebook for a case where the base station has a single panel and a codebook for a case where the base station has a multi-panel, and may be configured in relation to the antenna ports. In the 5G standard, a type I codebook is classified as a codebook for a multi-panel case.

That is, the 5G NR supports type 1 codebook, type 2 codebook, and enhanced type 2 codebook for multi-antenna transmission. The type 1 codebook, type 2 codebook, or enhanced type 2 codebook may be determined depending on the number of terminals supported in given time/frequency resources, and even within the same type, a codebook design considered may vary depending on the number of antenna panels.

However, in the current 5G standard, while variations exists depending on the codebook, a type 1 single-panel codebook supports up to 8 layers, while a type 1 multi-panel codebook supports up to 8 antenna panels, with up to 4 layers being considered for each panel. Therefore, it may be difficult to support ultra-massive Machine Type Communications (umMTC) and extremely reliable and low-latency communications (ERLLC), which are the goals of 6G terahertz wireless communication.

In addition, the 6G terahertz wireless communication is expected to utilize more antennas and wider frequency bands. This may cause a 'beam squint' phenomenon, where a difference in propagation delay between antennas increases, and a deviation in spatial direction observed for each subcarrier also increases.

However, the codebook design scheme defined in the current 5G standard cannot solve the beam squint phenomenon that occurs with a very large number of antennas and a very wide frequency band. Therefore, a new codebook design technique considering the 6G terahertz communication system is required. The present disclosure described below proposes a codebook design and/or generation technique considering the 6G terahertz communication system, especially considering the beam sequence phenomenon. Furthermore, the present disclosure proposes a configuration and signaling method for parameters required to prevent the beam squint phenomenon in a 6G terahertz communication system.

Figure 3:
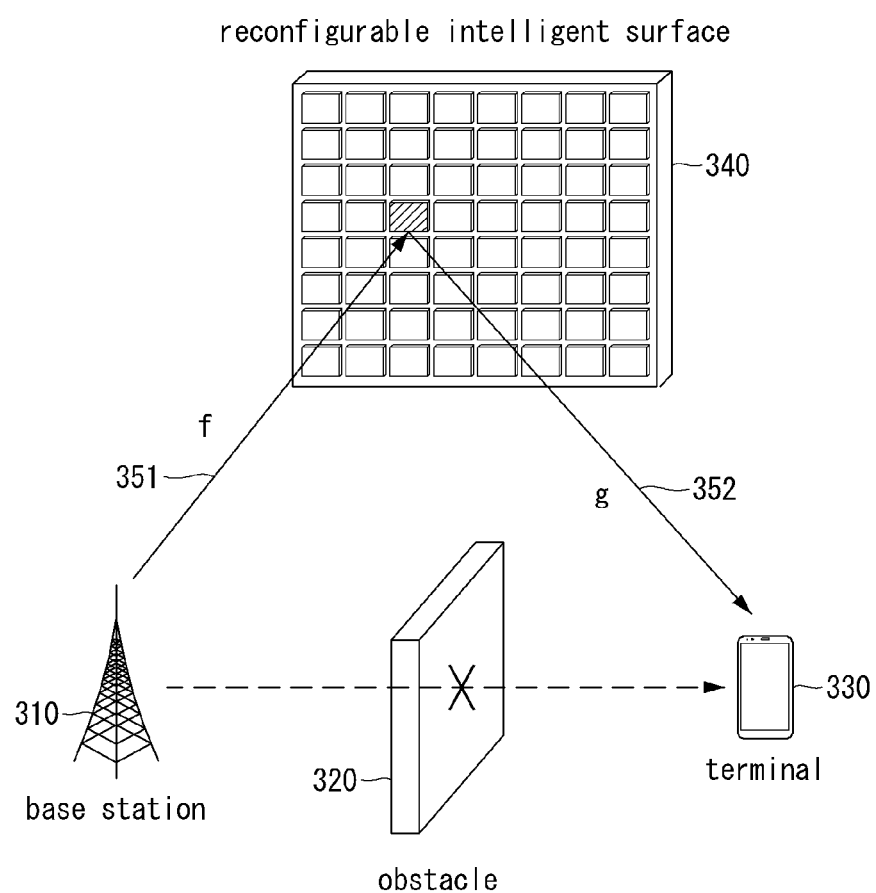
FIG. 3 is a conceptual diagram illustrating an exemplary embodiment for describing a communication network.

FIG. 3 is a conceptual diagram illustrating an exemplary embodiment for describing a communication network.

Referring to FIG. 3, the present disclosure provides apparatuses, methods, processing systems, and computer-readable media for generating or adjusting a codebook for performing precoding of RISs. The RIS may generally include an array of metamaterials that interact with radio signals by tuning impedance variations across a surface. A controller of the RIS (i.e. RIS controller) may control at least one element of the RIS (i.e. RIS element).

A communication network may include at least one of a base station 310, a terminal 320, an RIS 340, or an RIS controller. When the base station transmits a signal, if there is an obstacle, it may be difficult for the terminal to receive the signal transmitted by the base station. Therefore, the base station may need to transmit the signal while avoiding the obstacle. The base station may use the RIS to avoid the obstacle. The RIS 340 may change a transmission path of the signal between the base station and the terminal. In other words, the RIS 340 may reflect the signal by forming a reflection path between the base station and the terminal.

The base station 310 may transmit a signal to the terminal based on a channel between the base station 310 and the RIS 340 and a channel from the RIS to the terminal. A vector 351 for the channel between the base station and the RIS may be referred to as f 351, and a channel by the i-th element of the RIS may be expressed as $f_i$. A vector 352 for the channel from the RIS to the terminal may be referred to as g 352, and a channel by the i-th element of the RIS may be expressed as $g_i$.

The base station may identify the channel between the base station 310 and the RIS 340 and the channel from the RIS 340 to the terminal 330 through a procedure below.

When uplink and downlink are divided by time division duplexing (TDD), a downlink channel may be estimated based on an uplink channel. For example, a case where the terminal transmits a pilot signal to the base station may be assumed. In addition, it may be assumed that the RIS activates only the i-th element among the RIS elements. The RIS may deactivate all elements excluding the i-th element. Here, the pilot signal transmitted by the terminal may be transmitted to the i-th element of the RIS. The i-th element of the RIS may reflect the pilot signal transmitted by the terminal and transmit it to the base station. Accordingly, the base station may receive the pilot signal transmitted by the terminal. The base station may estimate a channel based on the received pilot signal. The pilot signal transmitted by the terminal may be transmitted through the channel between the base station 310 and the RIS 340 and the channel from the RIS 340 to the terminal 330. In addition, the pilot signal transmitted by the terminal may be transmitted to the base station through uplink. The base station may estimate a channel in which $f_i$ and $g_i$ are multiplied based on the pilot signal. In other words, the base station may estimate the downlink channel based on the uplink channel. In addition, the base station and terminal may estimate channels for all the RIS elements by multiplying $f_i$ and $g_i$ (i.e. i=0 . . . , (the total number of RIS element−1)). In this case, each channel obtained based on $f_i$ and $g_i$ may be referred to as a channel $f_i g_i$.

On the other hand, when the uplink and downlink are divided by frequency division duplexing (FDD), an uplink channel may be estimated based on a downlink channel. For example, the base station may transmit a pilot signal to the i-th element of the RIS. The i-th element of the RIS may reflect the pilot signal transmitted by the base station, and transmit it to the terminal. The terminal may receive the pilot signal transmitted by the i-th element of the RIS. The terminal may estimate channels $f_i g_i$ based on the signal transmitted by the base station. The terminal may transmit information on the estimated channels $f_i g_i$ to the base station. In other words, the terminal may transmit feedback information on the estimated channels to the base station. In this case, the terminal may quantize the estimated channels $f_i g_i$, and transmit the quantized information to the base station.

Meanwhile, each element of the RIS may be correlated with other elements. Therefore, the terminal and base station may estimate channels for other elements based on channel(s) estimated for some elements of the RIS.

Figure 4:
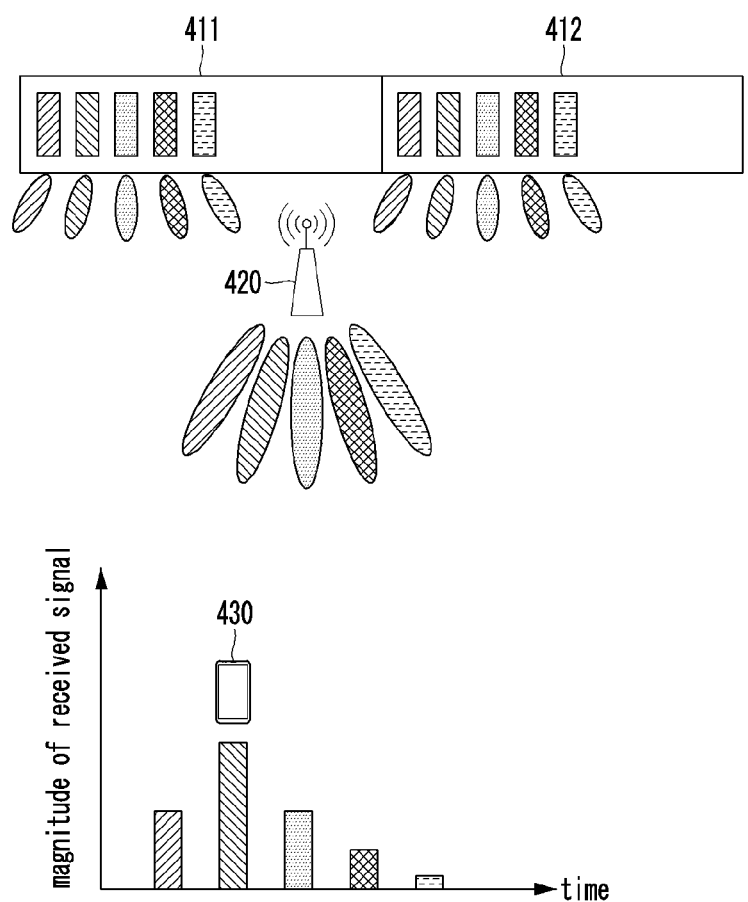
FIG. 4 is a conceptual diagram for describing a beam search procedure.

FIG. 4 is a conceptual diagram for describing a beam search procedure.

Referring to FIG. 4, illustrated is a procedure in which a terminal and a base station search for a beam using beams transmitted in 5 directions. The terminal and the base station may use a high frequency band such as a millimeter wave (mm Wave) band. When the terminal and the base station use millimeter waves, the terminal and the base station may perform a beamforming procedure without reflecting a signal through the RIS. The beamforming procedure of the terminal and the base station may refer to the existing beam search procedure defined in the NR.

The existing beam search procedure may be performed as follows. A base station 420 may transmit primary synchronization signal (PSS) sets 411 and 412 to a terminal. Each PSS set may include 5 PSSs. The base station may transmit a synchronization signal block (SSB) comprising the PSS. The SSB may include the PSS and a physical broadcast channel (PBCH). The SSB may be configured with 4 orthogonal frequency division multiplexing (OFDM) symbols. Therefore, the SSB may be referred to as an SS/PBCH block. In other words, the PSS may be transmitted as being included in the SSB or SS/PBCH block. Each PSS may have a different index. The base station 420 may transmit 5 PSSs in different directions. For example, the base station 420 may sequentially transmit signals in a plurality of directions. The base station may use a beam sweeping scheme to transmit signals in different directions. The base station may configure a plurality of beam sweeping regions at regular intervals. Each beam sweeping region may correspond to one or more SSBs.

The terminal 430 may receive the PSS(s) transmitted by the base station. The terminal may measure a received power for each received PSS, and the terminal may transmit information on a direction of a signal received with the highest received power among the received PSS(s) to the base station.

Figure 5:
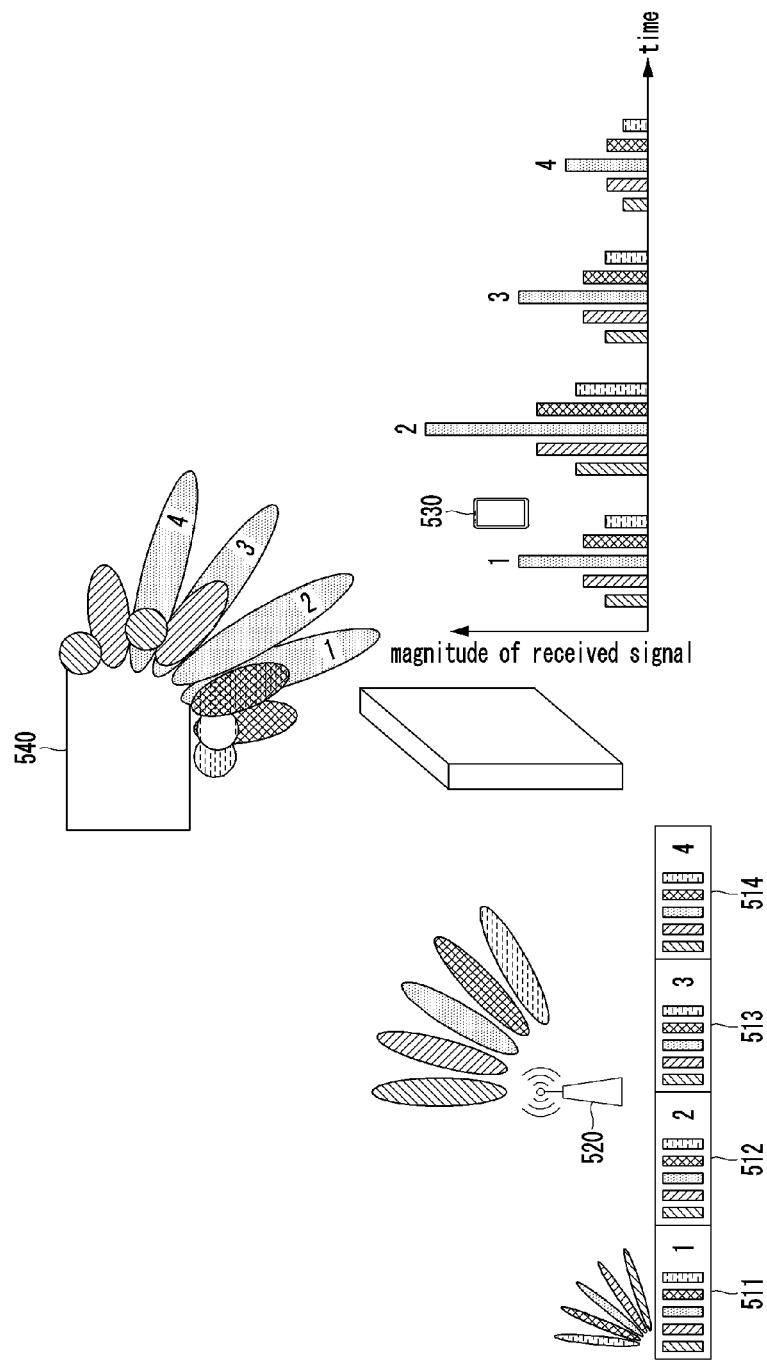
FIG. 5 is a conceptual diagram for describing a beam search procedure in a network environment including an RIS.

FIG. 5 is a conceptual diagram for describing a beam search procedure in a network environment including an RIS.

Referring to FIG. 5, the present disclosure proposes a beam search method in a network including an RIS. The terminal may perform a beam search procedure using PSS set(s) each comprising PSSs transmitted from the base station in 5 directions.

A base station 520 may periodically transmit PSSs with different indices in different directions. In this case, the base station may transmit the PSSs in different directions through a beam sweeping scheme. The base station may configure a beam direction of the RIS differently each time it transmits the PSS set, taking into account the RIS. Initial 4 PSS sets may be reflected by the RIS in different reflection directions. Each of the initial PSS sets 511, 512, 513, and 514 may include 5 PSSs. Each PSS may correspond to both a beam index of the base station and a beam index of the RIS. There may be 5 different beam indices of the base station, and there may be 4 different beam indices of the RIS. Accordingly, there may be 20 PSSs, and the 20 PSSs may correspond to different indices. For example, if one PSS has a beam index 1 for the base station and a beam index 2 for the RIS, another PSS may have a beam index 1 for the base station and a beam index 4 for the RIS. In addition, the base station may adjust phases of the RIS according to the beam index of the RIS.

The terminal may receive PSSs transmitted by the base station. The terminal may select a PSS with the highest received power based on the received PSSs. The terminal may inform an index for the PSS with the highest received power to the base station. The base station may receive the index informed by the terminal, and based on the received index, the base station may identify a beam index of the base station and a reflected beam index of the RIS, which are to be used to transmit signals to the terminal.

The beam search procedure in the network including the RIS may be a procedure for finding an optimal beam pattern from among given beam patterns. After the initial beam search procedure, the base station may perform a beamforming procedure of the RIS based on channel information.

The beamforming procedure in the RIS may be performed based on the estimated channels $f_i g_i$. The terminal may receive signals from the respective RIS elements, and the signals received by the terminal may have the same phase.

The terminal may perform beamforming by combining the signals having the same phase. The terminal may demodulate the signals transmitted by the base station based on the beamforming performed. The terminal may maximize a signal-to-noise ratio (SNR) in the process of demodulating the signals transmitted by the base station. In this case, in order to maximize the SNR of signals demodulated by the terminal, the phases of the signals coming into the terminal through the RIS may need to be the same. In addition, in order to maximize the SNR of signals demodulated by the terminal, a reflection coefficient of the RIS element may need to be large. For example, a reflection coefficient of the i-th element may be expressed as Equation 1 below.

$$\beta_i = e^{j\theta_i} \qquad \text{[Equation 1]}$$

$\theta_i$ may mean a phase value of the i-th element of the RIS. $\beta_i$ may mean a reflection coefficient of the i-th element. e may mean an exponential function. j may mean an imaginary number. The reflection coefficient of each element may be equal to 1. A phase of a signal reflected by each element may vary depending on a phase of the channel. The fact that the phase of the signal reflected by each element varies depending on the phase of the channel may be expressed as Equation 2 below.

$$\theta_i = -\text{angle}\{f_i g_i\} \qquad \text{[Equation 2]}$$

angle$\{f_i g_i\}$ may mean a phase of the channel $f_i g_i$. It may be difficult for the base station to transmit continuous phase values for the RIS elements. Accordingly, the base station may define a set of specific phase values for the RIS elements. The set of specific phase values may be referred to as a codebook. The base station may transmit a codebook to the RIS controller. Alternatively, the base station may change one phase included in the codebook into an index value, and transmit the index value to the RIS controller. The RIS controller may change the phases of the RIS elements based on the codebook or index value received from the base station.

The codebook may be designed with a quantization scheme that allows each element to have an ideal phase value. Here, the quantization scheme may include an element-by-element quantization scheme. For example, if 1 bit-quantization is considered for each element, the codebook may be designed as $\beta_i=\{1 \text{ or } -1\}$, that is, $\theta_i=\{0, \pi\}$. In addition, when performing 2-bit quantization, the codebook may be designed as $\beta_i=\{1, j, -1 \text{ or } -j\}$, that is, $$\theta_i = \{0, \frac{\pi}{2}, \pi, \frac{3\pi}{2}\}.$$

For example, the codebook may be designed based on column vectors of a Discrete Fourier Transform (DFT) matrix. The codebook designed based on column vectors of a DFT matrix may correspond to a vector quantization scheme that considers all elements of the RIS at once. For example, the vector quantization scheme may select one column vector that is most suitable for a current channel condition among $N_{RIS}$ column vectors in an $N_{RIS}$-point DFT matrix. The total number of elements of the RIS may be referred to as $N_{RIS}$. In other words, the base station may use a DFT matrix-based codebook designed based on column vectors of a DFT matrix. The base station may calculate a gain of the channel based on the DFT matrix-based codebook. The base station may generate an index value for the codebook that maximizes the channel gain. The codebook index that maximizes the gain of the channel may be expressed as Equation 3 below.

$$\arg\max_{k=\{1,\ldots,N_{RIS}\}} |g^T \Theta_k f|^2 \quad \text{[Equation 3]}$$

$\Theta_k$ may mean a diagonal matrix defined by the i-th column vector of the $N_{RIS}$-point DFT matrix. Alternatively, $\Theta_k$ may mean a diagonal matrix defined by the i-th column vector of a $(N_{RIS} \times k)$-point DFT matrix. k may mean an integer of 2 or more, and k may have an exponential form of 2. In other words, k may mean an integer equal to or greater than 2 and may be used in form of 2, 4, 8, 16, and 32.

The base station may transmit the codebook index that maximizes the gain of the channel to the RIS controller. The RIS controller may change the phases of the RIS elements based on the codebook index that maximizes the gain of the channel. The phase of signal transmitted from the base station may be changed through the phase change of the RIS elements.

If $\Theta_k$ is formed as a diagonal matrix based on the $(N_{RIS} \times k)$-point DFT matrix, the RIS controller may precisely change the phase of the signal received from the base station.

Each RIS element may have characteristics of reflecting an input signal to change a phase of the input signal. Each RIS element may have a reflection coefficient to have the characteristic of reflecting the input signal. In other words, the RIS elements may only change the phase of the input signal and may be assumed to have the characteristic of maintaining the reflection coefficients. In order for the RIS elements to change only the phase of the input signal and maintain the reflection coefficients, the base station may design a codebook using Equation 1.

Figure 6:
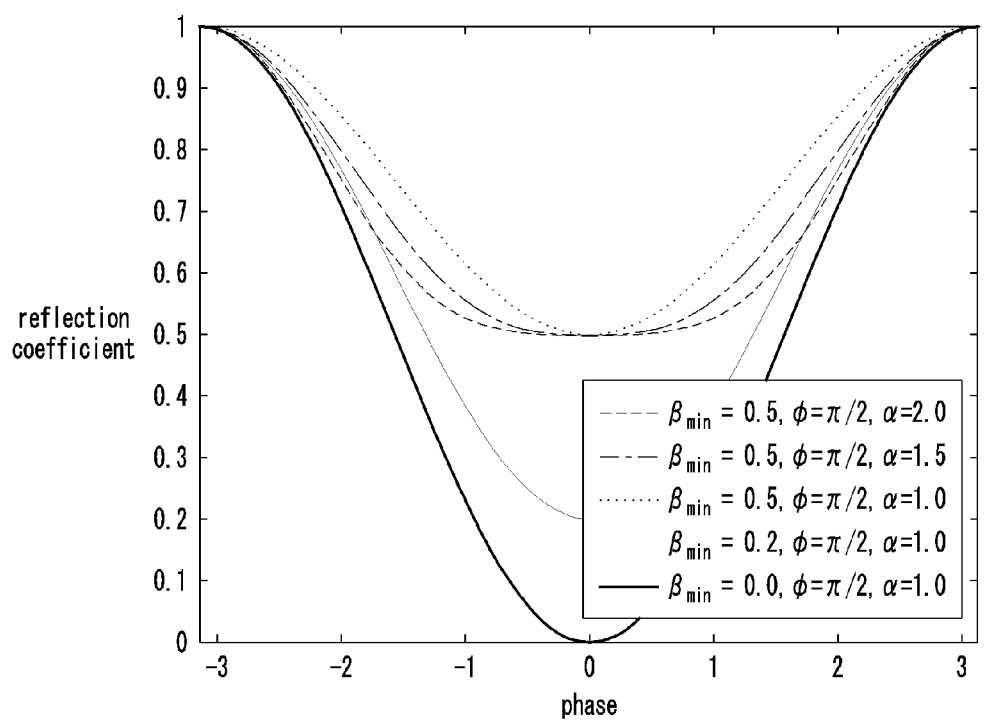
FIG. 6 is a conceptual diagram for describing a change in reflection coefficients.

FIG. 6 is a conceptual diagram for describing a change in reflection coefficients.

Referring to FIG. 6, reflection coefficients for RIS elements may change. Considering a change in the reflection coefficients, the reflection coefficients may be expressed as Equation 4 below.

$$\beta_i = \beta_i(\theta_i) e^{j\theta_i} \quad \text{[Equation 4]}$$

Here, $\beta_i(\theta_i)$ may not be 1 depending on $\theta_i$. Therefore, when $\theta_i$ is determined for each RIS element based on information on the channel $g_i f_i$, $\beta_i(\theta_i)$ may vary depending on the phase value $\theta_i$ of the RIS element. The base station may calculate reflection coefficients by reflecting the change characteristics of reflection coefficients changes, in the process of designing the codebook. The reflection coefficient according to phase may be expressed as Equation 5 below.

$$\beta_i(\theta_i) = (1 - \beta_{min}) \left( \frac{\sin(\theta_i - \phi) + 1}{2} \right)^\alpha + \beta_{min} \quad \text{[Equation 5]}$$

$\beta_i(\theta_i)$ may mean a reflection coefficient according to a phase value. $\beta_{min}$ may mean the minimum value of reflection coefficient. $\phi$ may mean a difference between $$-\frac{\pi}{2}$$

and a phase corresponding to $\beta_{min}$. $\alpha$ may mean a phase change rate.

Therefore, according to the present disclosure, a codebook that reflects the characteristics in which the shape of the reflected signal varies depending on the values of $\beta_{min}$, $\phi$, and $\alpha$ can be designed. When the base station uses an arbitrary RIS for the first time, the base station may first determine, with respect to the RIS, change characteristics of reflection coefficients according to phases of RIS elements. That is, the base station may perform an initialization procedure or a calibration procedure. The calibration procedure may include a process of identifying the change characteristics of reflection coefficients according to the phases of RIS elements and a process of designing a codebook by reflecting the identified change characteristics of reflection coefficients.

The base station may transmit a pilot signal to the RIS. The RIS may reflect the pilot signal to the terminal. The terminal may estimate a channel based on the received pilot signal. The terminal may transmit information on the estimated channel to the base station. The base station may generate parameter information based on the channel information transmitted by the terminal. The base station may derive the parameters based on the transmitted pilot signal. The parameters may include at least one of $\beta_{min}$, $\phi$, or $\alpha$. The parameters $\beta_{min}$, $\phi$, and $\alpha$ may change $\beta_i(\theta_i)$.

Meanwhile, the base station may perform a calibration procedure. The base station may transmit pilot signals to the RIS while changing phases of the pilot signals. The base station may estimate chain channels based on the pilot signals transmitted to the RIS. The chain channels may mean $\beta_i f_i g_i$. The base station may determine optimal parameters through a curve fitting scheme, etc. based on test data. The test data may refer to the chain channels estimated by the base station. The optimal parameters may mean $\beta_{min}$, $\phi$, and $\alpha$ for the highest chain channel value among the values obtained by the curve fitting scheme.

Through the calibration procedure, the base station may determine characteristics of specific RIS elements. The base station may use the RIS to communicate with the terminal by determining the characteristics of the specific RIS elements. The calibration procedure may be performed when the base station initially uses the RIS or when the base station changes the RIS.

Figure 7:
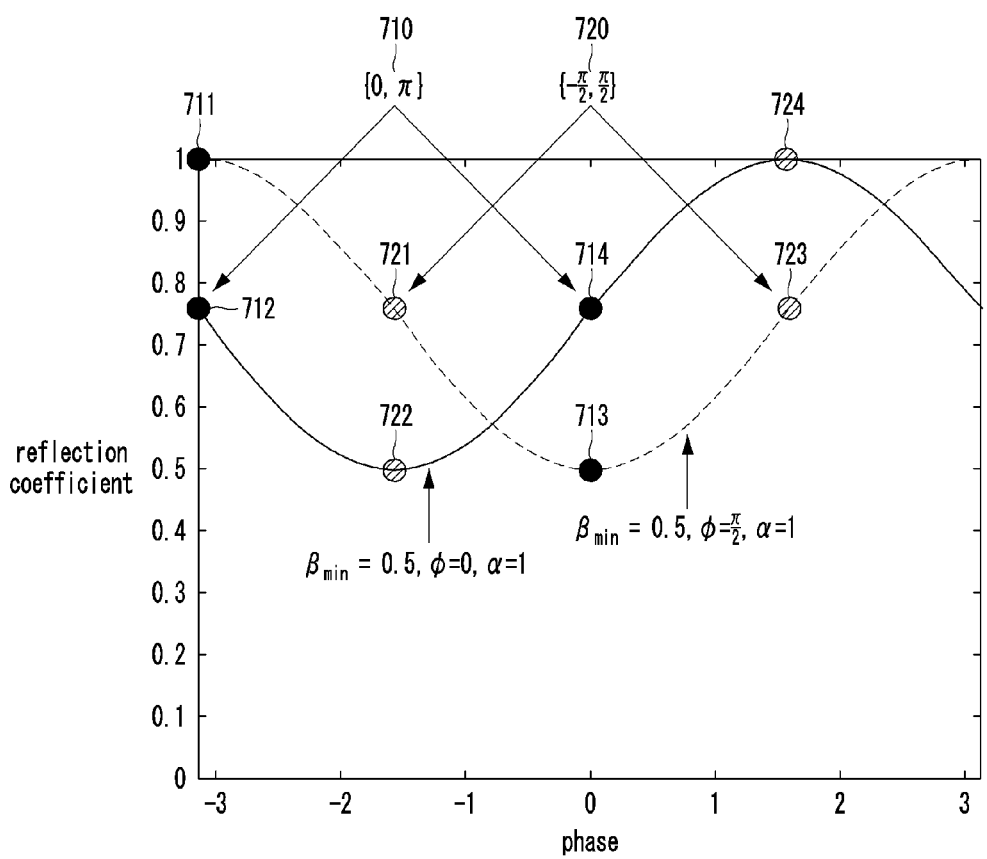
FIG. 7 is a conceptual diagram for describing 1-bit codebook design.

FIG. 7 is a conceptual diagram for describing 1-bit codebook design.

Referring to FIG. 7, a model representing a reflection coefficient varying according to a phase of a signal is illustrated. In addition, FIG. 7 illustrates a 1-bit codebook according to 2 values of $\phi$. $\phi$ may be used to construct a codebook. For example, a phase combination of the 1-bit codebook may be $\{0, \pi\}$ 710 and $$\left\{ -\frac{\pi}{2}, \frac{\pi}{2} \right\}$$

720. When the phase combination of the codebook is $\{0, \pi\}$, $\beta_{min}$ may be 0.5, and a phase of $\beta_{min}$ may be 0. Accordingly, $\phi$ may be $$\frac{\pi}{2}.$$

When the phase combination of the codebook is $$\{-\frac{\pi}{2}, \frac{\pi}{2}\}.$$

$\beta_{min}$ may 0.5, and a phase of $\beta_{min}$ may be $$-\frac{\pi}{2}.$$

Accordingly, $\phi$ may be 0.

When $\phi$ is $$\frac{\pi}{2},$$

the 1-bit codebook (e.g. 711, 723, 715, or 727) may use the phase combination $\{0, \pi\}$ (e.g. 711 or 715). Here, depending on selection of the phase, the reflection coefficient may vary to 1 or 0.5. The base station may design the codebook by shifting it by $$\frac{\pi}{2}.$$

The 1-bit codebook may use the phase combination $$\{-\frac{\pi}{2}, \frac{\pi}{2}\}$$

(e.g. 723 or 727). Here, regardless of the selection of the phase, the reflection coefficient may be maintained as 0.75 (e.g. 723 or 727). Therefore, the base station may generate a codebook with little performance change depending on the phase of the signal.

On the other hand, when $\phi$ is 0, the 1-bit codebook (e.g. 712, 724, 716, or 728) may use the phase combination $\{0, \pi\}$ (e.g. 712, 716). Regardless of selection of the phase, the reflection coefficient may be maintained as 0.75. The base station may design the codebook by shifting the phase by $\pi/2$. The 1-bit codebook may use the phase combination $$\{-\frac{\pi}{2}, \frac{\pi}{2}\}$$

(e.g. 724, 727). Depending on the selection of phase, the reflection coefficient may change to 1 or 0.5. Therefore, when $\phi$ is 0, the base station may maintain the performance by using the 1-bit codebook for the phase combination $\{0, \pi\}$. In other words, according to use of the 1-bit codebook, the base station may shift the codebook throughout to make the reflection coefficients of the RIS elements constant.

Figure 8:
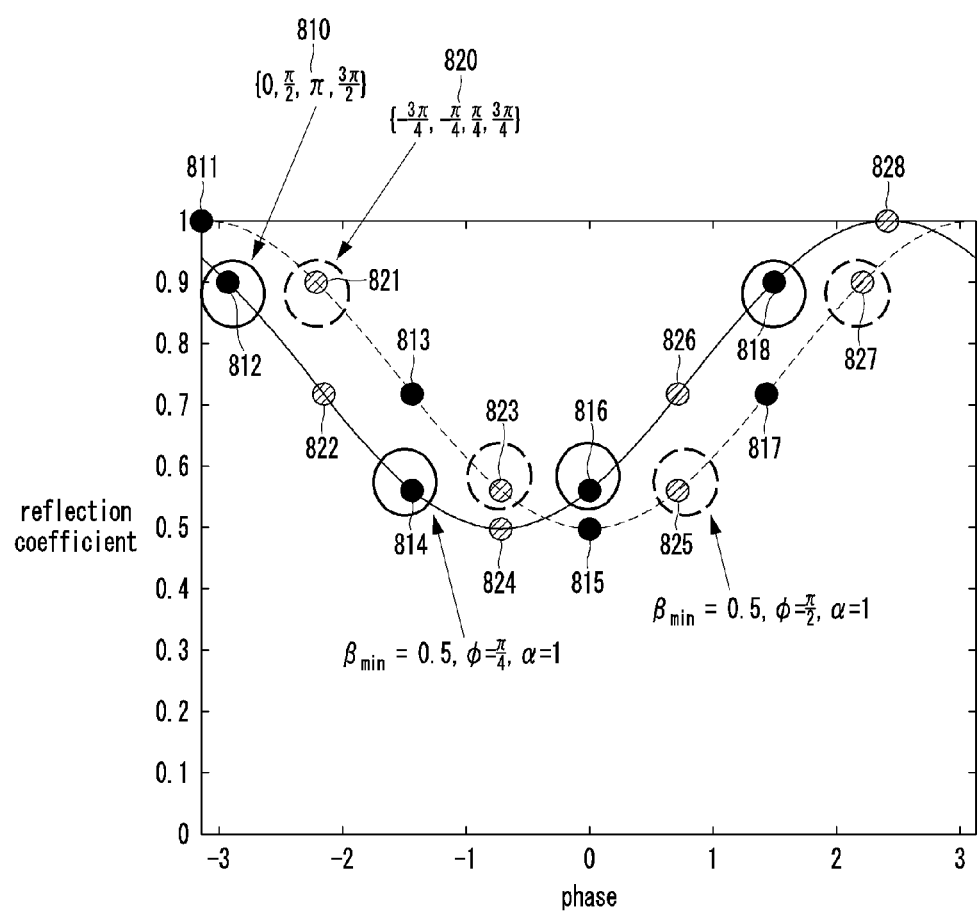
FIG. 8 is a conceptual diagram for describing 2-bit codebook design.

FIG. 8 is a conceptual diagram for describing 2-bit codebook design.

Referring to FIG. 8, a model representing a reflection coefficient varying according to a phase of a signal is illustrated. In addition, FIG. 8 illustrates a 2-bit codebook according to 4 values of $\phi$.

Unlike the 1-bit codebook, the 2-bit codebook may be designed to reduce a phase difference as much as possible. The 2-bit codebook may have an interval of 90 degrees. Therefore, the base station may design the 2-bit codebook with 4 phases. The 2-bit codebook may have a phase combination $$\{0, \frac{\pi}{2}, \pi, \frac{3\pi}{2}\}.$$

The 2-bit codebook may have a phase combination of $$\{-\frac{3\pi}{4}, -\frac{\pi}{4}, \frac{\pi}{4}, \frac{3\pi}{4}\}.$$

Accordingly, the phase combinations of the 2-bit codebook may be $$\{0, \frac{\pi}{2}, \pi, \frac{3\pi}{2}\}$$

810 and $$\{-\frac{3\pi}{4}, -\frac{\pi}{4}, \frac{\pi}{4}, \frac{3\pi}{4}\}$$

820. When the phase combination of the codebook is $$\{0, \frac{\pi}{2}, \pi, \frac{3\pi}{2}\}$$

810, $\beta_{min}$ may be 0.5, and a phase of $\beta_{min}$ may be 0. Accordingly, $\phi$ may be $$\frac{\pi}{2}.$$

In addition, when the phase combination of the codebook is $$\{-\frac{3\pi}{4}, -\frac{\pi}{4}, \frac{\pi}{4}, \frac{3\pi}{4}\}$$

820, $\beta_{min}$ may be 0.5, and a phase of $\beta_{min}$ may be $$-\frac{\pi}{4}.$$

Accordingly, $\phi$ may be $$\frac{\pi}{4}.$$

When $\phi$ is $$\frac{\pi}{2},$$

the 2-bit codebook (e.g. 811, 821, 813, 823, 815, 825, 817, and 827) may use the phase combination $$\left\{0, \frac{\pi}{2}, \pi, \frac{3\pi}{2}\right\}.$$

Here, depending on selection of the phase, the reflection coefficient may change to 1 or 0.5. The base station may design the codebook by shifting the phase by $$\frac{\pi}{4}.$$

The 2-bit codebook may use the phase combination $$\left\{-\frac{3\pi}{4}, -\frac{\pi}{4}, \frac{\pi}{4}, \frac{3\pi}{4}\right\}$$

820. Here, depending on selection of the phase, the reflection coefficient may be greater than 0.5 and less than 1.0. Accordingly, when the 2-bit codebook uses the phase combination $$\left\{-\frac{3\pi}{4}, -\frac{\pi}{4}, \frac{\pi}{4}, \frac{3\pi}{4}\right\}$$

820, the codebook with less change in performance than the case of using the phase combination $$\left\{0, \frac{\pi}{2}, \pi, \frac{3\pi}{2}\right\}$$

may be generated.
When $\phi$ is $$\frac{\pi}{4},$$

the 2-bit codebook (e.g. 812, 822, 814, 824, 816, 826, 818, and 828) may use the phase combination $$\left\{0, \frac{\pi}{2}, \pi, \frac{3\pi}{2}\right\}$$

(e.g. 812, 814, 816, 818). Here, depending on selection use the phase combination of the phase, the reflection coefficient may be greater than 0.5 and less than 1.0. In addition, the base station may design the codebook by shifting the phase by $$\frac{\pi}{4}.$$

The 2-bit codebook may use the phase combination $$\left\{-\frac{3\pi}{4}, -\frac{\pi}{4}, \frac{\pi}{4}, \frac{3\pi}{4}\right\}$$

(e.g. 820). Here, depending on selection of the phase, the reflection coefficient may be equal to or greater than 0.5 and less than 1.0. Accordingly, when the 2-bit codebook uses the phase combination $$\left\{0, \frac{\pi}{2}, \pi, \frac{3\pi}{2}\right\},$$

the codebook with less change in performance than the case of using the phase combination $$\left\{-\frac{3\pi}{4}, -\frac{\pi}{4}, \frac{\pi}{4}, \frac{3\pi}{4}\right\}$$

may be generated.
In other words, in case that $\phi$ is $\pi/2$, the 2-bit codebook may have a small change in performance when using the phase combination $$\left\{-\frac{3\pi}{4}, -\frac{\pi}{4}, \frac{\pi}{4}, \frac{3\pi}{4}\right\}.$$

In addition, in case that $\phi$ is $$\frac{\pi}{4},$$

the 2-bit codebook may have a small change in performance when using the phase combination $$\left\{0, \frac{\pi}{2}, \pi, \frac{3\pi}{2}\right\}.$$

Figure 9:
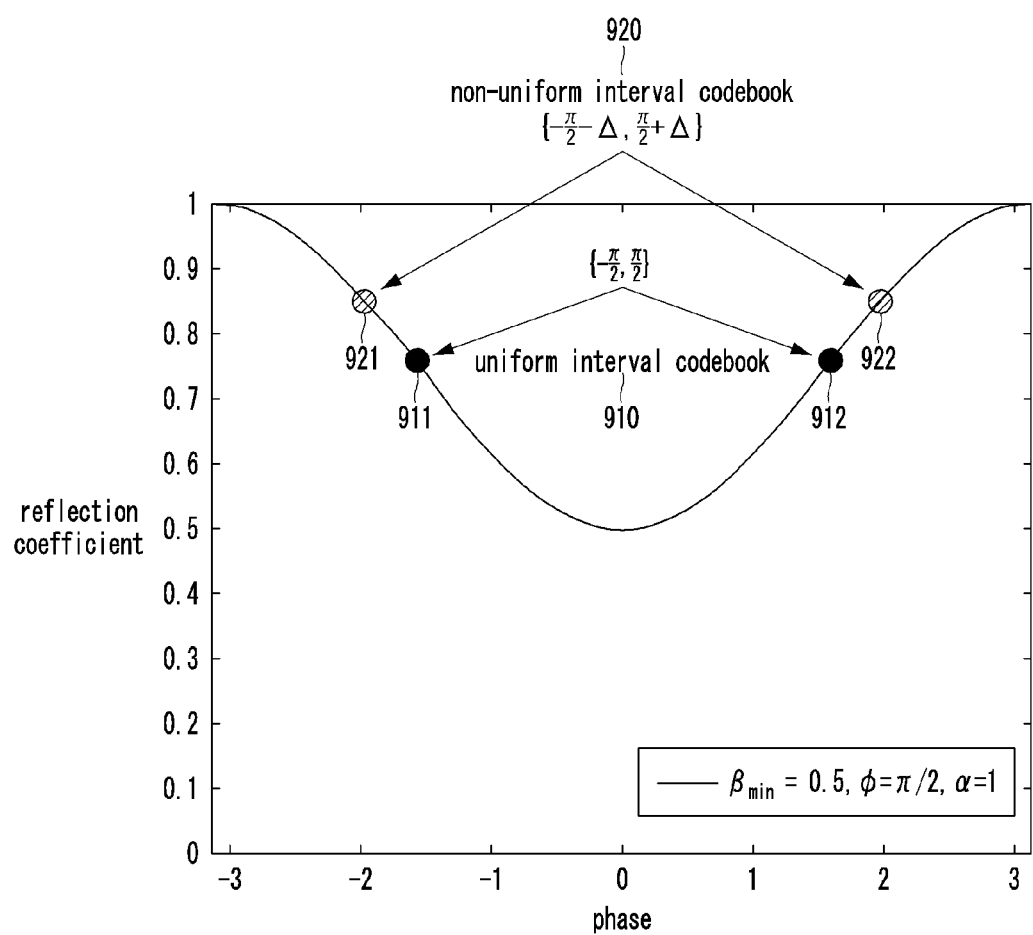
FIG. 9 is a conceptual diagram for describing codebook design.

FIG. 9 is a conceptual diagram for describing codebook design.
Referring to FIG. 9, reflection coefficients when $\beta_{min}=0.2$, $$\phi = \frac{\pi}{2},$$

and $\alpha=\{0.5, 1.0, 1.5, 2.0\}$ are shown. According to the present disclosure, when designing a codebook, phases of codes may be configured to have uniform intervals. However, if the reflection coefficient changes depending on the phase, the phases having the uniform interval may cause a decrease in communication performance. Accordingly, exemplary embodiments of the present disclosure may use a phase shift value to minimize the communication performance degradation.

When a codebook is designed based on phases 911 and 912 having a uniform interval, error values of the codebook may be minimized considering only a phase of signals. However, when further considering magnitudes, a phenomenon may occur where an error in one portion becomes larger than an error in the other portion. Therefore, the base station may set a phase difference to be small for a portion with larger magnitude (e.g. 921, 922). Further, the base station may set a phase difference to be large for a portion with smaller magnitude (e.g. 911, 912). The base station may optimize the error values by adjusting the phase differences. The base station may use Δ (radian) to adjust the phase difference.

The base station may identify an overall effective SNR while changing Δ (radian). The base station may generate an optimal value of Δ based on the effective SNR. The effective SNR may be expressed as Equation 6 below.

$$\text{Effective } SNR = \frac{|\beta_i(\theta_i + \Delta)|^2}{|\beta_i(\theta_i + \Delta) - \hat{\beta}_i(\theta_i)|^2} \quad \text{[Equation 6]}$$

Δ may mean a phase shift value. Also, Δ may mean a phase interval adjustment value according to a non-uniform interval codebook 920. $\beta_i(\theta_i+\Delta)$ may mean a reflection coefficient considering Δ, $\beta_{min}$, ϕ, and α. $\hat{\beta}_i(\theta_i)$ may be expressed as $\hat{\beta}_i(\theta_i)=e^{j\theta_i}$, and $\hat{\beta}_i(\theta_i)$ may mean an ideal reflection coefficient.

Figure 10:
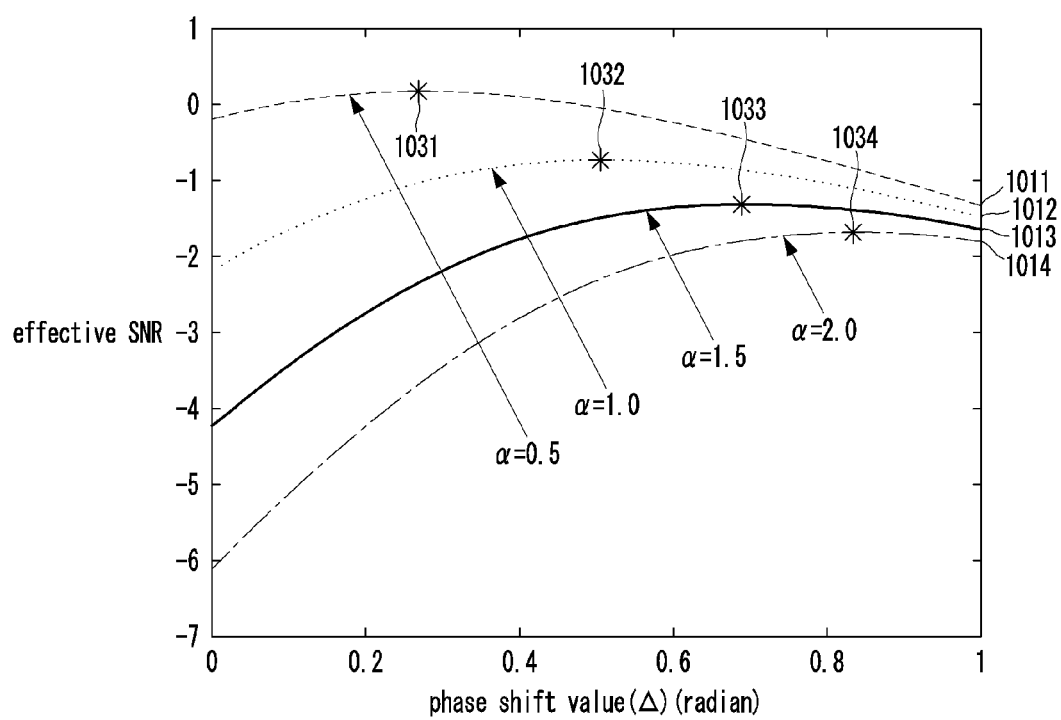
FIG. 10 is a conceptual diagram illustrating effective SNRs according to phase interval adjustment values.

FIG. 10 is a conceptual diagram illustrating effective SNRs according to phase interval adjustment values.

Referring to FIG. 10, a method for generating an optimal Δ based on $\beta_{min}$, ϕ, and α will be described. Here, $\beta_{min}$ may be assumed to be 0.2, ϕ may be assumed to be $$\frac{\pi}{2},$$

and α may be assumed to be {0.5, 1.0, 1.5, 2.0}. FIG. 10 shows effective SNRs and/or signal-to-quantize-noise ratios (SQNRs) according to the phase shift values Δ.

The base station can obtain optimal communication performance when designing the codebook based on Δ, which maximizes the effective SNR. However, as α increases, a change in phase may increase, and an optimal codebook may be designed at a large value of Δ. The reference numerals 1031, 1032, 1033, and 1034 may represent the optimal Δ for each α (e.g. 1011, 1012, 1013, 1014).

Figure 11:
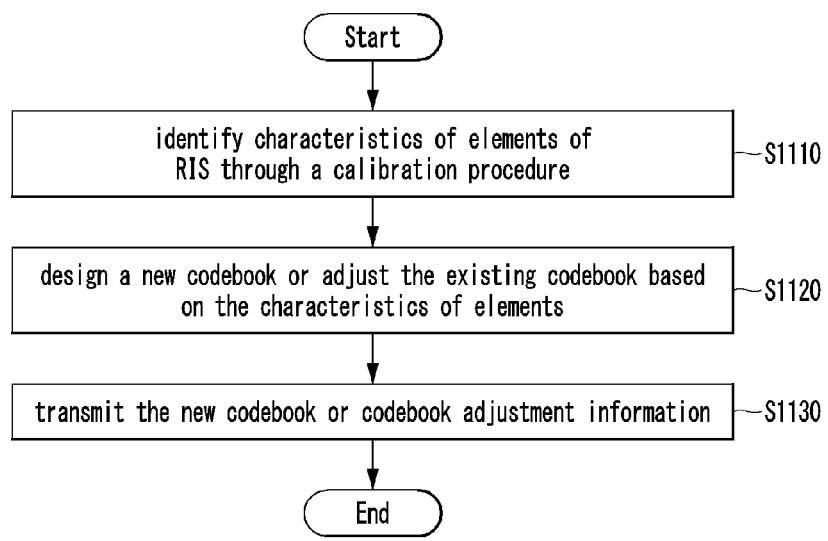
FIG. 11 is a flow chart for describing a method of designing a codebook.

FIG. 11 is a flow chart for describing a method of designing a codebook.

Referring to FIG. 11, the base station may design a codebook considering the characteristics (i.e. $\beta_{min}$, ϕ and α) of the RIS elements generated in the calibration procedure. In addition, the base station may adjust the already designed codebook by taking into account the characteristics (i.e. $\beta_{min}$, ϕ and α) of the RIS elements generated in the calibration procedure.

An initial configuration procedure for the base station to communicate with the terminal using the RIS may be as follows. The base station may decide which RIS to utilize. The base station may transmit a pilot signal several times to the determined RIS. The RIS may reflect the pilot signal to the terminal.

In general, while the base station performs the initial configuration procedure, the RIS may only perform passive procedures. The passive procedures may include a procedure for receiving input signals and a procedure for reflecting the input signals.

Meanwhile, according to the present disclosure, the base station may determine parameters for the characteristics of the RIS elements, and may use the pilot signals to determine the parameters. The base station may perform various methods to determine the parameters. For example, the base station may determine the parameters by performing the calibration procedure (S1110). In the calibration procedure, the RIS may estimate the parameters including $\beta_{min}$, ϕ and α by itself. Then, the RIS may deliver its own estimated parameters to the base station, and the base station may receive the parameters estimated by the RIS. The base station may determine the parameters including $\beta_{min}$, ϕ, and α through the calibration procedure. In other words, the base station may determine the characteristics ($\beta_{min}$, ϕ, and α) of the RIS elements during the calibration procedure for the RIS elements (S1110).

The base station may design a new codebook based on the parameters (S1120). In addition, the base station may adjust the already-designed codebook by determining a phase shift value therefor (S1120). The base station may adjust the overall phases of the codebook according to $\beta_{min}$, ϕ, and α in order to communicate with the terminal. The phase shift value may be generated by the base station based on the estimated $\beta_{min}$, ϕ, and α.

The base station may transmit the designed codebook to the RIS controller (S1130). Alternatively, the base station may transmit the phase shift value to the RIS controller (S1130). The phase shift value may be referred to as 'codebook adjustment information'. The RIS controller may receive the phase shift value transmitted by the base station, and adjust the phase of the codebook based on the phase shift value. The RIS controller may adjust phases of the RIS elements based on the adjusted codebook. This allows the base station to transmit wireless signals to the terminal through the RIS.

Figure 12:
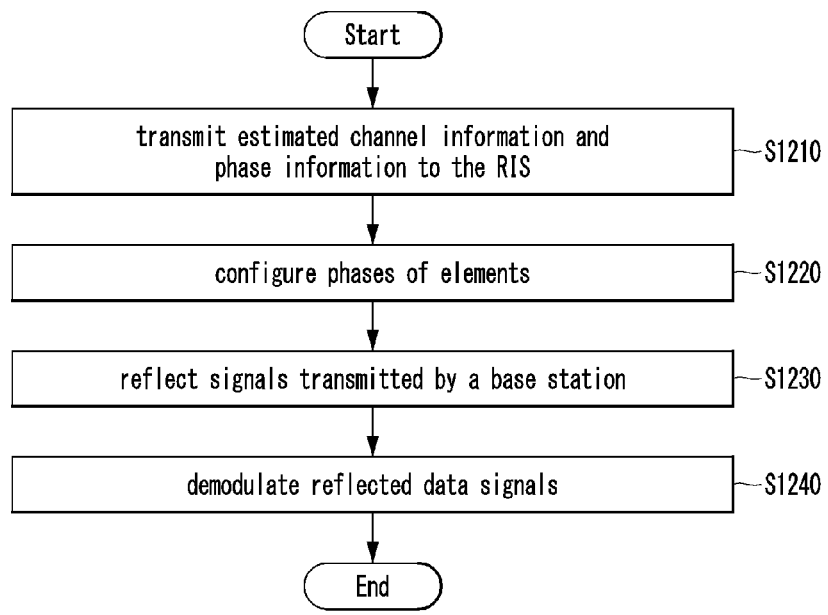
FIG. 12 is a flowchart for describing a method of transmitting data.

FIG. 12 is a flowchart for describing a method of transmitting data.

Referring to FIG. 12, the base station may design a codebook, and may perform a beamforming procedure based on the designed codebook. The base station may reflect signals to the terminal based on the RIS.

The base station may transmit estimated channel information and phase information to the RIS controller (S1210). The estimated channel information may mean information on the channels $f_i g_i$. The phase information may refer to control information for the base station to control the RIS. The phase information may refer to information included in the codebook. The information included in the codebook may include $\beta_{min}$, ϕ, α, and phase combination. The RIS controller may receive the estimated channel information and phase information transmitted by the base station.

The RIS controller may set the phase of each element by using the received estimated channel information and phase information based on the previously received codebook (S1220).

The base station may transmit a data signal to the terminal using the RIS. The RIS may reflect the signal transmitted by the base station according to the set phases (S1230). The terminal may receive the signal reflected by the RIS, and demodulate the data signal based on the received signal (S1240).

Figure 13:
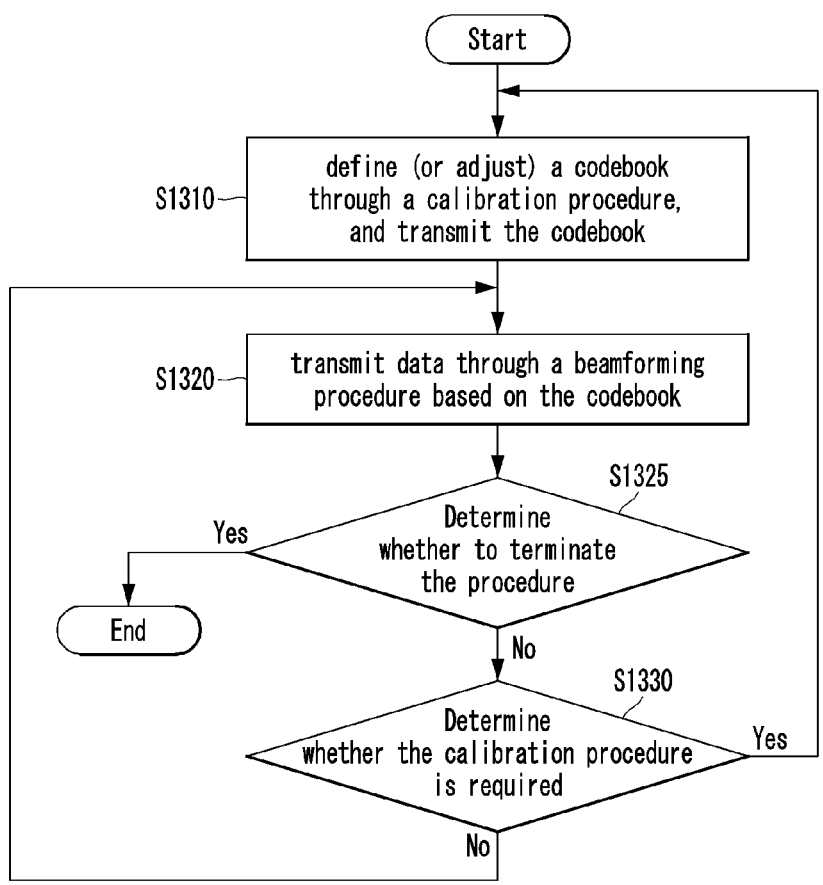
FIG. 13 is a flow chart for describing a process of transmitting a signal through an RIS.

FIG. 13 is a flow chart for describing a process of transmitting a signal through an RIS.

Referring to FIG. 13, illustrated are a procedure for the base station to design a codebook and a procedure for transmitting a signal based on the designed codebook.

The base station may define (or adjust) a codebook according to the calibration procedure. The base station may transmit the codebook to the RIS controller (S1310). The RIS controller may change phases for the RIS elements based on the codebook transmitted by the base station. The base station may transmit data to the terminal by performing a beamforming procedure through the RIS changed based on the codebook (S1320). The RIS may reflect signals transmitted from the base station to the terminal.

The base station may determine whether to terminate the procedure (S1325). When the base station has transmitted all data to be transmitted to the terminal, the procedure may be terminated. When there is remaining data to be transmitted to the terminal, the base station may determine whether a calibration procedure is required.

The base station may determine whether it is required to perform the calibration procedure again (S1330). The base station may need to re-perform the calibration procedure when the base station uses a new RIS. Additionally or alternatively, the base station may need to re-perform the calibration procedure when the base station changes the RIS utilized by the base station. If the calibration procedure is not required, the base station may transmit signals without changes to the RIS and RIS elements. If the calibration procedure is required, the base station may define a new codebook and transmit it to the RSI controller, or transmit codebook adjustment information to the RIS controller.

Meanwhile, according to the present disclosure, a phase value may be set for each element of the RIS, and the codebook may be adjusted based on the phase value set for each element. However, according to the present disclosure, a phase value may be set for multiple elements as one group, and the codebook may be adjusted based on the phase value set for multiple elements as one group.

In addition, the present disclosure proposes the method of adjusting the codebook by calculating changes in the reflection coefficients of the RIS elements based on $\beta_{min}$, $\phi$, and $\alpha$. However, exemplary embodiments of the present disclosure may include a method of adjusting the codebook by calculating changes in the reflection coefficients of the RIS element based on other method(s) and other parameter(s).

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a base station, comprising:
transmitting a pilot signal to a terminal by using a reconfigurable intelligent surface (RIS);
receiving, from the terminal, channel information measured based on the pilot signal;
estimating characteristics of elements of the RIS based on the channel information;
generating a codebook based on the estimated characteristics of the elements; and
transmitting the codebook to a controller of the RIS.

2. The method according to claim 1, further comprising:
transmitting the pilot signal to the terminal using the RIS changed by the codebook;
receiving, from the terminal, channel information re-measured based on the pilot signal;
re-estimating the characteristics of the elements of the RIS based on the re-measured channel information;
adjusting the codebook based on the re-estimated characteristics of the elements; and
transmitting the adjusted codebook including changed values to the controller of the RIS.

3. The method according to claim 1, wherein the characteristics of the elements include at least one of reflection coefficient, minimum reflection coefficient, phase difference, or phase change rate.

4. The method according to claim 1, wherein the generating of the codebook based on the estimated characteristics of the elements includes: generating the codebook by quantizing a value of a reflection coefficient and a phase of a signal.

5. The method according to claim 1, wherein the generating of the codebook based on the estimated characteristics of the elements includes: generating the codebook reflecting change characteristics of reflection coefficients of the elements based on at least one of minimum reflection coefficient, phase difference, or phase change rate.

6. A method of a terminal, comprising:
receiving a pilot signal from a base station through a reconfigurable intelligent surface (RIS);
generating channel information based on the pilot signal;

transmitting the channel information to the base station; and performing communication with the base station through the RIS based on a codebook generated based on the channel information, wherein characteristics of elements of the RIS are estimated based on the channel information, and the codebook is generated considering the characteristics of the elements.

7. The method according to claim 6, further comprising:

receiving a pilot signal from the base station through the RIS changed by the codebook;

re-generating channel information based on the pilot signal;

transmitting the re-generated channel information to the base station; and performing communication with the base station through the RIS adjusted based on a codebook adjusted considering the re-generated channel information, wherein adjusted characteristics of the elements of the adjusted RIS are estimated based the re-generated channel information, and the adjusted codebook is generated based on the adjusted characteristic of the elements.

8. The method according to claim 6, wherein the characteristics of the elements include at least one of reflection coefficient, minimum reflection coefficient, phase difference, or phase change rate.

9. A base station comprising at least one processor, wherein the at least one processor causes the base station to perform:

transmitting a pilot signal to a terminal by using a reconfigurable intelligent surface (RIS);

receiving, from the terminal, channel information measured based on the pilot signal;

estimating characteristics of elements of the RIS based on the channel information;

generating a codebook based on the estimated characteristics of the elements; and transmitting the codebook to a controller of the RIS.

10. The base station according to claim 9, wherein the at least one processor further causes the base station to perform:

transmitting the pilot signal to the terminal using the RIS changed by the codebook;

receiving, from the terminal, channel information re-measured based on the pilot signal;

re-estimating the characteristics of the elements of the RIS based on the re-measured channel information;

adjusting the codebook based on the re-estimated characteristics of the elements; and transmitting the adjusted codebook including changed values to the controller of the RIS.

11. The base station according to claim 9, wherein the characteristics of the elements include at least one of reflection coefficient, minimum reflection coefficient, phase difference, or phase change rate.

12. The base station according to claim 9, wherein in the generating of the codebook based on the estimated characteristics of the elements, the at least one processor further causes the base station to perform: generating the codebook by quantizing a value of a reflection coefficient and a phase of a signal.

13. The base station according to claim 9, wherein in the generating of the codebook based on the estimated characteristics of the elements, the at least one processor further causes the base station to perform: generating the codebook reflecting change characteristics of reflection coefficients of the elements based on at least one of minimum reflection coefficient, phase difference, or phase change rate.

* * * * *